United States Patent
Maeda et al.

(10) Patent No.: US 10,622,678 B2
(45) Date of Patent: Apr. 14, 2020

(54) LITHIUM ION SECONDARY BATTERY

(71) Applicant: NEC CORPORATION, Tokyo (JP)

(72) Inventors: Katsumi Maeda, Tokyo (JP); Noriyuki Tamura, Tokyo (JP); Sadanori Hattori, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 120 days.

(21) Appl. No.: 15/736,067

(22) PCT Filed: Jun. 23, 2016

(86) PCT No.: PCT/JP2016/068672
§ 371 (c)(1),
(2) Date: Dec. 13, 2017

(87) PCT Pub. No.: WO2017/010255
PCT Pub. Date: Jan. 19, 2017

(65) Prior Publication Data
US 2018/0145371 A1  May 24, 2018

(30) Foreign Application Priority Data
Jul. 15, 2015  (JP) ................................. 2015-141187

(51) Int. Cl.
*H01M 10/0567* (2010.01)
*H01M 4/505* (2010.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC combination set(s) only.
See application file for complete search history.

(56) References Cited

U.S. PATENT DOCUMENTS

2008/0102376 A1* 5/2008 Kato ..................... C01B 25/455
429/332
2008/0153005 A1* 6/2008 Horikawa ........... H01M 10/052
429/314

(Continued)

FOREIGN PATENT DOCUMENTS

JP          3439085 B2     8/2003
JP      2008-269978 A    11/2008
(Continued)

OTHER PUBLICATIONS

Sheng Shui Zhang, "A review on electrolyte additives for lithium-ion batteries", Journal of Power Sources, 2006, pp. 1379-1394, No. 162, vol. 2.

(Continued)

*Primary Examiner* — Kaity V Chandler
(74) *Attorney, Agent, or Firm* — Sughrue Mion, PLLC

(57) ABSTRACT

In terms of a lithium ion secondary battery using, in a positive electrode, a lithium transition metal composite oxide containing an over-stoichiometric amount of lithium, a lithium ion secondary battery in which an amount of a gas generated during charge/discharge cycles is reduced and capacity retention is improved is provided. The lithium ion secondary battery includes a positive electrode containing a lithium transition metal composite oxide containing Fe and containing an over-stoichiometric amount of lithium, and a nonaqueous electrolyte solution, and the nonaqueous electrolyte solution contains a nonaqueous organic solvent, an electrolyte, and lithium difluorophosphate.

5 Claims, 1 Drawing Sheet

(51) Int. Cl.
  *H01M 4/525* (2010.01)
  *H01M 10/0525* (2010.01)
  *H01M 10/0569* (2010.01)
  *H01M 10/052* (2010.01)
  *H01M 4/02* (2006.01)

(52) U.S. Cl.
  CPC ..... *H01M 10/052* (2013.01); *H01M 10/0525* (2013.01); *H01M 10/0569* (2013.01); *H01M 2004/028* (2013.01); *H01M 2300/0037* (2013.01); *Y02T 10/7011* (2013.01)

(56) References Cited

U.S. PATENT DOCUMENTS

| | | | | |
|---|---|---|---|---|
| 2008/0305402 A1* | 12/2008 | Kato | ............ | C01B 25/455 429/338 |
| 2010/0015514 A1* | 1/2010 | Miyagi | ............ | H01M 4/131 429/129 |
| 2010/0035146 A1* | 2/2010 | Fujii | ............ | H01M 10/0525 429/200 |
| 2010/0099031 A1* | 4/2010 | Kato | ............ | H01M 10/052 429/330 |
| 2010/0119956 A1* | 5/2010 | Tokuda | ............ | H01M 4/134 429/338 |
| 2010/0323240 A1* | 12/2010 | Tsujioka | ............ | C01B 25/455 429/199 |
| 2011/0091768 A1* | 4/2011 | Ohashi | ............ | H01M 10/052 429/199 |
| 2011/0111288 A1* | 5/2011 | Nishida | ............ | C01B 25/455 429/199 |
| 2011/0311885 A1* | 12/2011 | Yamada | ............ | C07F 1/005 429/338 |
| 2012/0316716 A1* | 12/2012 | Odani | ............ | H01M 10/0567 701/22 |
| 2013/0084493 A1* | 4/2013 | Tokuda | ............ | H01M 4/5825 429/200 |
| 2013/0330609 A1* | 12/2013 | Sawa | ............ | H01M 4/587 429/200 |
| 2013/0330610 A1* | 12/2013 | Shigematsu | ...... | H01M 10/0567 429/200 |
| 2013/0337317 A1* | 12/2013 | Shima | ............ | H01M 10/052 429/188 |
| 2015/0004481 A1* | 1/2015 | Iwahori | ............ | H01M 10/0567 429/188 |
| 2015/0140448 A1* | 5/2015 | Takiguchi | ......... | H01M 10/0569 429/332 |
| 2015/0207142 A1* | 7/2015 | Takijiri | ............ | H01M 4/505 429/199 |
| 2015/0207147 A1* | 7/2015 | Nagai | ............ | H01M 10/0567 429/231.95 |
| 2016/0013517 A1* | 1/2016 | Nakazawa | ......... | H01M 10/052 429/200 |

FOREIGN PATENT DOCUMENTS

| | | |
|---|---|---|
| JP | 2010-040382 A | 2/2010 |
| JP | 2013-055000 A | 3/2013 |
| JP | 2013-254605 A | 12/2013 |
| JP | 2014-022276 A | 2/2014 |
| JP | 2014-022335 A | 2/2014 |
| WO | 2014/034043 A1 | 3/2014 |

OTHER PUBLICATIONS

International Search Report for PCT/JP2016/068672 dated Aug. 30, 2016 [PCT/ISA/210].

* cited by examiner

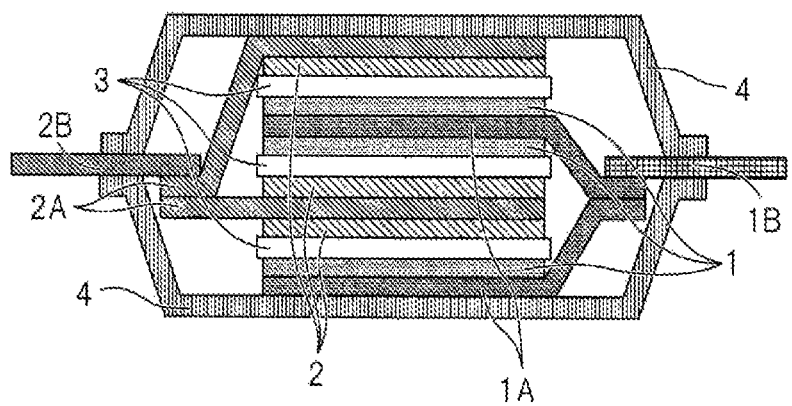

LITHIUM ION SECONDARY BATTERY

CROSS REFERENCE TO RELATED APPLICATIONS

This application is a National Stage of International Application No. PCT/JP2016/068672 filed Jun. 23, 2016, claiming priority based on Japanese Patent Application No. 2015-141187 filed Jul. 15, 2015, the contents of all of which are incorporated herein by reference in their entirety.

TECHNICAL FIELD

The present example embodiment relates to a lithium ion secondary battery.

BACKGROUND ART

Owing to advantages of a high energy density, small self-discharge and excellent long-term reliability, lithium ion secondary batteries containing a nonaqueous electrolyte solution are practically used as batteries for compact electronic devices such as a notebook personal computer and a cellular phone. Besides, the lithium ion secondary batteries have been applied to electric vehicles, household storage batteries, and electric power storage.

However, a decomposition product of a solvent contained in the electrolyte solution produced through reductive decomposition on the surface of a negative electrode may deposit on the surface of the negative electrode to increase the resistance, or a gas generated through the decomposition of the solvent may swell the battery. Besides, a decomposition product of the solvent produced through oxidative decomposition on the surface of a positive electrode may deposit on the surface of the positive electrode to increase the resistance, or a gas generated through the decomposition of the solvent may swell the battery. As a result, there arises a problem that battery characteristics are degraded because the storage characteristic of a battery is degraded or the cycle characteristic of a secondary battery is degraded.

In one of methods for solving the above-described problem, a compound having a function to form a protective coating is added to a nonaqueous electrolyte solution. Specifically, decomposition of the compound added to the electrolyte solution is intentionally impelled on the surface of an electrode active material in performing an initial charge operation, so that the resultant decomposition product may form a protective coating having a protective function for preventing the decomposition of a solvent. The protective coating having the protective function for preventing the decomposition of a solvent is called as an SEI (Solid Electrolyte Interface).

Non Patent Literature 1 describes that a chemical reaction or decomposition of a solvent occurring on the surface of an electrode is appropriately suppressed by forming a protective coating on the surface of a negative electrode from an additive, and thus the battery characteristics of a secondary battery are retained. In this literature, however, it is presumed that an SEI is formed on the surface of the negative electrode from the additive, and gas generation and the like through the oxidative decomposition of the solvent on a positive electrode is not sufficiently suppressed.

On the other hand, use of a high-potential positive electrode for realizing a high energy density secondary battery is under examination. Patent Literatures 1 and 2 disclose a lithium ion secondary battery using, as a positive electrode active material, a lithium transition metal composite oxide containing an over-stoichiometric amount of lithium. A high potential lithium ion secondary battery as described in Patent Literatures 1 and 2 has a potential of 4.5 V or more. Therefore, as compared with a lithium ion secondary battery having a general voltage (of 3.5 to 4.2 V), the gas generation through the oxidative decomposition of a solvent is easily caused on a positive electrode. Accordingly, there is a demand for a technique for suppressing the gas generation on a positive electrode in a high potential lithium ion secondary battery.

Patent Literature 3 discloses a method for suppressing the gas generation from a positive electrode by using a silane coupling agent and an epoxy resin for forming a protective coating on the surface of the positive electrode. Besides, Patent Literature 4 discloses a method for suppressing the gas generation from a positive electrode by causing a boric acid compound to adhere to a positive electrode active material. On the other hand, Patent Literatures 5 and 6 disclose a technique to improve the storage characteristic and the like of a battery by adding lithium difluorophosphate to a nonaqueous electrolyte solution.

CITATION LIST

Patent Literature

Patent Literature 1: JP2013-254605A
Patent Literature 2: JP2014-22335A
Patent Literature 3: JP2014-22276A
Patent Literature 4: JP2010-40382A
Patent Literature 5: JP3439085B
Patent Literature 6: JP2013-55000A

Non Patent Literature

Non Patent Literature 1: Journal of Power Sources, No. 162, vol. 2, pp. 1379-1394 (2006)

SUMMARY OF INVENTION

Technical Problem

In employing the methods described in Patent Literatures 3 to 6, however, in a lithium ion secondary battery having a high potential of 4.5 V or more and using, in a positive electrode, a lithium transition metal composite oxide containing excessive lithium, the gas generation cannot be sufficiently suppressed during charge/discharge cycles, and capacity retention is degraded.

An object of a present example embodiment is, in terms of a lithium ion secondary battery using, in a positive electrode, a lithium transition metal composite oxide containing an over-stoichiometric amount of lithium, to provide a lithium ion secondary battery in which an amount of a gas generated during charge/discharge cycles is reduced and capacity retention is improved.

Solution to Problem

A lithium ion secondary battery according to a present example embodiment is a lithium ion secondary battery including: a positive electrode containing a lithium transition metal composite oxide containing Fe and containing an over-stoichiometric amount of lithium; and a nonaqueous electrolyte solution, and the nonaqueous electrolyte solution contains a nonaqueous organic solvent, an electrolyte, and lithium difluorophosphate.

Advantageous Effects of Invention

According to a present example embodiment, in terms of a lithium ion secondary battery using, in a positive electrode, a lithium transition metal composite oxide containing an over-stoichiometric amount of lithium, it is possible to provide a lithium ion secondary battery in which an amount of a gas generated during charge/discharge cycles is reduced and capacity retention is improved.

BRIEF DESCRIPTION OF THE DRAWING

FIG. 1 is a cross-sectional view of an example of a structure of a lithium ion secondary battery according to a present example embodiment.

DETAILED DESCRIPTION

Example Embodiment

The present inventors have found that, in a lithium ion secondary battery using, as a positive electrode active material, a lithium transition metal composite oxide containing Fe and containing an over-stoichiometric amount of lithium, if a nonaqueous electrolyte solution contains lithium difluorophosphate, generation of a gas within the lithium ion secondary battery can be sufficiently suppressed and capacity retention during charge/discharge cycles is improved. The reason why the above-described effects can be attained if the nonaqueous electrolyte solution contains lithium difluorophosphate in the lithium ion secondary battery using, as a positive electrode active material, a lithium transition metal composite oxide containing Fe and containing an over-stoichiometric amount of lithium is not clear, but is presumed, for example, as follows: Since a coating derived from the lithium difluorophosphate is formed on the surface of the positive electrode active material at the initial stage of charge, decomposition of a nonaqueous organic solvent on the surface of the positive electrode active material is suppressed during charge/discharge cycles. The lithium ion secondary battery according to the present example embodiment will now be described below in detail.

<Positive Electrode>

A positive electrode of the present example embodiment contains, as the positive electrode active material, a lithium transition metal composite oxide containing Fe and containing an over-stoichiometric amount of lithium. The positive electrode includes, for example, a positive electrode current collector, and a positive electrode active material layer formed on the positive electrode current collector and containing a positive electrode active material, a conductive auxiliary agent, and a positive electrode binder.

In the present example embodiment, the lithium transition metal composite oxide containing Fe and containing an over-stoichiometric amount of lithium (hereinafter also referred to as the lithium-rich transition metal composite oxide) is used as the positive electrode active material. The lithium transition metal composite oxide containing an over-stoichiometric amount of lithium refers to, for example, a lithium transition metal composite oxide represented by $Li_xM_yO_2$ (wherein M represents a transition metal) in which the amount of Li exceeds 1 ($x>1$) although the stoichiometric amount of Li is 1 ($x=1$). Specific examples include $Li_2MnO_3$-$LiMO_2$-based solid solutions (wherein M is Co, Ni, Fe, Mn or the like).

The lithium-rich transition metal composite oxide is preferably a compound containing Fe and represented by the following formula (1) from the viewpoint of cost.

$$Li_{1+a}Ni_xMn_yFe_zO_2 \qquad (1)$$

In formula (1), $0<a\leq0.5$, $0<x<1$, $0<y<1$, and $0<z<1$. It is preferable that $0.1\leq a\leq0.4$, and more preferable that $0.2\leq a\leq0.3$. It is preferable that $0.05\leq x\leq0.5$, and more preferable that $0.1\leq x\leq0.3$. It is preferable that $0.2\leq y\leq0.8$, and more preferable that $0.4\leq y\leq0.6$. It is preferable that $0.05\leq z\leq0.5$, and more preferable that $0.1\leq z\leq0.3$.

Besides, in order to improve the cycle characteristic and safety and to enable use at a high charging potential, a part of a transition metal of the lithium-rich transition metal composite oxide may be substituted by another element. For example, a compound obtained by substituting, by at least one element selected from the group consisting of Co, Sn, Mg, Ti, Al, Zr, Cr, V, Ga, Ge, Zn, Cu, Bi, Mo and La, a part of at least one element selected from the group consisting of Ni, Mn and Fe contained in the compound represented by the above-described formula (1) may be used. Alternatively, a compound in which a part of oxygen contained in the lithium-rich transition metal composite oxide is substituted by S or F can be used. Besides, the surface of lithium-rich transition metal composite oxide may be coated by a compound containing such another element.

Specific examples of the lithium-rich transition metal composite oxide include: $Li_{1.19}Mn_{0.52}Fe_{0.22}O_{1.98}$, $Li_{1.21}Mn_{0.46}Fe_{0.15}Ni_{0.15}O_2$, $Li_{1.2}Mn_{0.4}Fe_{0.4}O_2$, $Li_{1.21}Mn_{0.4}Fe_{0.2}Ni_{0.2}O_2$, $Li_{1.23}Fe_{0.15}Ni_{0.15}Mn_{0.46}O_2$, $Li_{1.26}Fe_{0.11}Ni_{0.11}Mn_{0.52}O_2$, $Li_{1.2}Fe_{0.20}Ni_{0.20}Mn_{0.40}O_2$, $Li_{1.29}Fe_{0.07}Ni_{0.14}Mn_{0.57}O_2$, $Li_{1.26}Fe_{0.22}Mn_{0.37}Ti_{0.15}O_2$, $Li_{1.29}Fe_{0.07}Ni_{0.07}Mn_{0.57}O_{2.8}$, $Li_{1.30}Fe_{0.04}Ni_{0.07}Mn_{0.61}O_2$, $Li_{1.23}Fe_{0.03}Ni_{0.03}Mn_{0.58}O_2$. One of these lithium-rich transition metal composite oxides may be singly used, or two or more of these may be used together. It is noted that a method for synthesizing the lithium-rich transition metal composite oxide is not especially limited.

The positive electrode active material layer may contain a conductive auxiliary agent for purposes of lowering the impedance. Examples of the conductive auxiliary agent include graphite such as natural graphite and artificial graphite, and carbon black such as acetylene black, ketchen black, furnace black, channel black and thermal black. A plurality of types of conductive auxiliary agents may be appropriately mixed for use. If the positive electrode active material layer contains the conductive auxiliary agent, a content of the conductive auxiliary agent is preferably 1 to 10 parts by mass with respect to 100 parts by mass of the positive electrode active material.

The positive electrode binder is not especially limited, and examples include polyvinylidene fluoride, a vinylidene fluoride-hexafluoropropylene copolymer, a vinylidene fluoride-tetrafluoroethylene copolymer, a styrene-butadiene copolymer rubber, polytetrafluoroethylene, polypropylene, polyethylene, polyimide and polyamide imide. One of these may be singly used, or two or more of these may be used together. In particular, from the viewpoint of versatility and low cost, polyvinylidene fluoride is preferably used as the positive electrode binder. If the positive electrode active material layer contains the positive electrode binder, a content of the positive electrode binder is preferably 2 to 10 parts by mass with respect to 100 parts by mass of the positive electrode active material from the viewpoint of "sufficient binding force" and "energy increase" that are in a trade-off relationship.

As the positive electrode current collector, for example, an aluminum foil, a stainless steel lath or the like can be used.

The positive electrode can be produced by, for example, obtaining a slurry by kneading a mixture of the positive electrode active material, the conductive auxiliary agent and the positive electrode binder with a solvent such as N-methyl pyrrolidone added thereto, applying the slurry onto the positive electrode current collector by a doctor blade method or a die coating method, and drying the resultant.

<Negative Electrode>

The lithium ion secondary battery according to the present example embodiment can include a negative electrode. The negative electrode is not especially limited, and includes, for example, a negative electrode current collector, and a negative electrode active material layer formed on the negative electrode current collector and containing a negative electrode active material and a negative electrode binder.

The negative electrode preferably contains, as the negative electrode active material, a material capable of intercalating/deintercalating a lithium ion. An example of the material capable of intercalating/deintercalating a lithium ion includes a metal or an alloy alloyable with lithium, such as tin. Other examples include oxides such as niobium pentoxide ($Nb_2O_5$), a lithium titanium composite oxide ($Li_{4/3}Ti_{5/3}O_4$) and titanium dioxide ($TiO_2$). Still another example includes carbon such as graphite, carbon black, coke, a mesocarbon microbead, hard carbon and graphite. Examples of the graphite include artificial graphite and natural graphite. Examples of the carbon black include acetylene black and furnace black. Alternatively, a negative electrode active material containing silicon may be used. Examples of the negative electrode active material containing silicon include silicon and a silicon compound. Examples of the silicon compound include a silicon oxide, silicate, and a compound of a transition metal and silicon such as nickel silicide or cobalt silicide. One of these may be singly used, or two or more of these may be used together. Among these, at least one selected from the group consisting of silicon, a silicon oxide and carbon is preferably used as the negative electrode active material from the viewpoint of a battery capacity and a stable operation.

The silicon compound is preferably used for reducing expansion/contraction of the negative electrode active material itself through repeated charge/discharge operations from the viewpoint of the charge/discharge cycle characteristic. Besides, some type of silicon compound has a function of attaining the electrical conductivity between silicon. From these points of view, the silicon compound is preferably a silicon oxide. The silicon oxide is not especially limited, and an example includes an oxide represented by $SiO_x$ ($0<x\leq2$). The silicon oxide may contain lithium. A silicon oxide containing lithium is represented by, for example, $SiLi_yO_z$ ($0<y$ and $0<z<2$).

Besides, the silicon oxide may contain a small amount of another metal element or non-metal element. The silicon oxide can contain, for example, at least one element selected from nitrogen, boron and sulfur in an amount of, for example, 0.1 to 5% by mass. If the silicon oxide contains a small amount of a metal element or non-metal element, the electrical conductivity of the silicon oxide is improved. Besides, the silicon oxide may be crystalline or amorphous.

Besides, if the negative electrode active material contains silicon or a silicon oxide, the negative electrode active material preferably further contains carbon. The carbon may be composited with the silicon or the silicon oxide. The carbon has functions of reducing the expansion/contraction of the negative electrode active material itself through the repeated charge/discharge operations and of attaining the electrical conductivity between silicon similarly to the silicon oxide. In particular, if the negative electrode active material contains silicon, a silicon oxide and carbon, a better cycle characteristic can be obtained.

As the carbon, graphite, amorphous carbon, diamond-like carbon, carbon nanotube or the like can be used. The graphite having high crystallinity has high electrical conductivity, and is excellent in adhesion to the positive electrode current collector of a metal such as copper, and in voltage flatness. On the other hand, the amorphous carbon having low crystallinity is comparatively less expanded in volume, and hence can reduce volume expansion of the whole negative electrode, and is difficult to be degraded by non-uniformity such as a grain boundary or a defect. A content of the carbon in the negative electrode active material is preferably 2% by mass or more and 50% by mass or less, and more preferably 2% by mass or more and 30% by mass or less.

The negative electrode active material containing silicon and a silicon compound can be produced, if a silicon oxide is used as the silicon compound, for example, by mixing silicon and the silicon oxide and sintering the resultant mixture at a high temperature under reduced pressure. Alternatively, if a compound of a transition metal and silicon is used as the silicon compound, the negative electrode active material can be produced by, for example, mixing and melting silicon and the transition metal, or by coating the surface of silicon with the transition metal by deposition or the like.

When composited with carbon, for example, under a high temperature non-oxygen atmosphere, the sintered product of the mixture of silicon and the silicon compound is introduced into an organic compound gas atmosphere, and thus, a coating layer containing carbon can be formed around a nucleus of silicon and the silicon oxide. Alternatively, for example, under high temperature non-oxygen atmosphere, the sintered product of the mixture of silicon and the silicon oxide and a precursor resin of carbon are mixed, and thus, a coating layer containing carbon can be formed around a nucleus of silicon and the silicon oxide. When the coating layer containing carbon is thus formed around the nucleus of silicon and the silicon oxide, the volume expansion otherwise caused through the charge/discharge can be suppressed, and the cycle characteristic can be further improved.

If silicon is used as the negative electrode active material, the negative electrode active material is preferably a complex containing silicon, a silicon oxide and carbon (hereinafter also referred to as a Si/SiO/C complex).

Furthermore, the whole or a part of the silicon oxide preferably has an amorphous structure. A silicon oxide having an amorphous structure can suppress the volume expansion of carbon and silicon. Although the mechanism is not clear, it is presumed that film formation on an interface between carbon and the electrolyte solution is somehow affected when the silicon oxide has an amorphous structure. Besides, it is presumed that an amorphous structure has a comparatively small number of elements derived from non-uniformity such as a grain boundary or a defect.

It can be confirmed by X-ray diffraction measurement that the whole or a part of the silicon oxide has an amorphous structure. If the silicon oxide does not have an amorphous structure, a peak peculiar to the silicon oxide is strongly observed in the X-ray diffraction measurement. On the other hand, if the whole or a part of the silicon oxide has an amorphous structure, a peak peculiar to the silicon oxide is broad in the X-ray diffraction measurement.

In a Si/SiO/C complex, the whole or a part of the silicon is preferably dispersed in the silicon oxide. If at least a part of the silicon is dispersed in the silicon oxide, the volume expansion of the negative electrode as a whole can be further suppressed, and in addition, decomposition of the electrolyte solution can be suppressed. It can be confirmed, by transmission electron microscope observation and energy dispersive X-ray spectrometry employed together, that the whole or a part of the silicon is dispersed in the silicon oxide. Specifically, a cross-section of a sample is observed with a transmission electron microscope, and an oxygen concentration in a silicon portion dispersed in the silicon oxide is measured by the energy dispersive X-ray spectrometry. As a result, it can be confirmed that the silicon dispersed in the silicon oxide is not an oxide.

In the Si/SiO/C complex, for example, the whole or a part of the silicon oxide has an amorphous structure and the whole or a part of the silicon is dispersed in the silicon oxide. Such a Si/SiO/C complex can be produced by, for example, a method disclosed in JP2004-47404A. Specifically, the Si/SiO/C complex can be obtained by, for example, subjecting a silicon oxide to CVD processing in an atmosphere containing an organic gas such as a methane gas. In the Si/SiO/C complex obtained by this method, a surface of a particle of the silicon oxide containing silicon is coated with carbon. Besides, the silicon is present in the silicon oxide as a nanocluster.

In the Si/SiO/C complex, ratios of the silicon, the silicon oxide and the carbon are not especially limited, and are preferably the following ratios. The silicon is contained in the Si/SiO/C complex in a ratio of preferably 5% by mass or more and 90% by mass or less, and more preferably 20% by mass or more and 50% by mass or less. The silicon oxide is contained in the Si/SiO/C complex in a ratio of preferably 5% by mass or more and 90% by mass or less, and more preferably 40% by mass or more and 70% by mass or less. The carbon is contained in the Si/SiO/C complex in a ratio of preferably 2% by mass or more and 50% by mass or less, and more preferably 2% by mass or more and 30% by mass or less.

Besides, the Si/SiO/C complex may be a mixture of the silicon, the silicon oxide and the carbon. Such a mixture can be produced, for example, by mixing the silicon in a particulate form, the silicon oxide in a particulate form and the carbon in a particulate form by mechanical milling.

The average particle size of the silicon is preferably smaller than the average particle sizes of the carbon and the silicon oxide. Thus, the silicon largely changed in volume during a charge/discharge operation has a relatively small diameter, and the carbon and the silicon oxide less changed in volume have relatively large diameters, and hence, generation of dendrite and pulverization of alloy are suppressed. Besides, during a charge/discharge process, lithium is intercalated in and deintercalated from a particle having a large diameter, a particle having a small diameter and a particle having a large diameter in this order, and also from this point, occurrence of residual stress and residual strain is suppressed.

The average particle size of the silicon is preferably 20 μm or less, and more preferably 15 μm or less. The average particle size of the silicon oxide is preferably ½ or less of the average particle size of the carbon. The average particle size of the silicon is preferably ½ or less of the average particle size of the silicon oxide. Besides, it is more preferable that the average particle size of the silicon oxide is ½ or less of the average particle size of the carbon and that the average particle size of the silicon is ½ or less of the average particle size of the silicon oxide. When the average particle sizes are controlled to fall in the above-described ranges, the effect of reducing the volume expansion can be more effectively attained, and hence, a secondary battery excellent in balance among the energy density, the cycle life and the efficiency can be obtained. More specifically, it is preferable that graphite is used as the carbon, that the average particle size of the silicon oxide is ½ or less of the average particle size of the graphite, and that the average particle size of the silicon is ½ or less of the average particle size of the silicon oxide. It is noted that the average particle size is measured by a laser diffraction scattering method or a dynamic light scattering method.

As the negative electrode active material, the above-described Si/SiO/C complex having a surface treated with a silane coupling agent or the like may be used. The negative electrode active material layer contains the negative electrode active material in an amount of preferably 55% by mass or more, and more preferably 65% by mass or more.

The negative electrode binder is not especially limited, and for example, polyvinylidene fluoride, a vinylidene fluoride-hexafluoropropylene copolymer, a vinylidene fluoride-tetrafluoroethylene copolymer, a styrene-butadiene copolymer rubber (SBR), polytetrafluoroethylene, polypropylene, polyethylene, polyimide, polyamide imide, polyacrylic acid or carboxymethyl cellulose containing a lithium salt, a sodium salt or a potassium salt neutralized with an alkali, or the like can be used. One of these may be singly used, or two or more of these may be used together. Among these, polyimide, polyamide imide, SBR, or polyacrylic acid or carboxymethyl cellulose containing a lithium salt, a sodium salt or a potassium salt neutralized with an alkali is preferably used because of high binding property. The amount of the negative electrode binder to be used is preferably 5 to 25 parts by mass with respect to 100 parts by mass of the negative electrode active material from the viewpoint of "sufficient binding force" and "energy increase" that are in a trade-off relationship.

As a material of the negative electrode current collector, a metal material such as copper, nickel, or stainless steel is used. Among these, copper is preferably used because of processing easiness and cost. Besides, a surface of the negative electrode current collector is preferably subjected to a surface roughening treatment beforehand. Examples of the shape of the negative electrode current collector include a foil, a plate, and a mesh. Alternatively, a perforated collector of an expanded metal, a punching metal etc. can be used.

The negative electrode can be produced in the same manner as the positive electrode. The negative electrode can be produced, for example, by obtaining a slurry by kneading a mixture of the negative electrode active material, the negative electrode binder, and various auxiliary agents if necessary with a solvent added thereto, applying the slurry onto the negative electrode current collector, and drying the resultant.

<Nonaqueous Electrolyte Solution>

The lithium ion secondary battery according to the present example embodiment includes a nonaqueous electrolyte solution. The nonaqueous electrolyte solution contains a nonaqueous organic solvent, an electrolyte, and lithium difluorophosphate.

Examples of the nonaqueous organic solvent include a cyclic carbonate, a chain carbonate, a chain ester, a lactone, an ether, a sulfone, a nitrile, and a phosphate.

Specific examples of the cyclic carbonate include propylene carbonate, ethylene carbonate (EC), butylene carbonate, vinylene carbonate and vinyl ethylene carbonate. Specific examples of the chain carbonate include dimethyl carbonate, diethyl carbonate (DEC), dipropyl carbonate, dibutyl carbonate, ethyl methyl carbonate, methyl propyl carbonate, methyl isopropyl carbonate, and methyl butyl carbonate. Specific examples of the chain ester include methyl formate, methyl acetate, methyl propionate, ethyl propionate, methyl pivalate, and ethyl pivalate.

Specific examples of the lactone include γ-butyrolactone, δ-valerolactone, and α-methyl-γ-butyrolactone. Specific examples of the ether include tetrahydrofuran, 2-methyl tetrahydrofuran, 1,3-dioxolane, 1,3-dioxane, 1,4-dioxane, 1,2-dimethoxyethane, 1,2-diethoxyethane, and 1,2-dibutoxyethane. Specific examples of the sulfone include sulfolane, 3-methyl sulfolane, and 2,4-dimethyl sulfolane. Specific examples of the nitrile include acetonitrile, propionitrile, succinitrile, glutaronitrile, and adiponitrile. Specific examples of the phosphate include trimethyl phosphate, triethyl phosphate, tributyl phosphate, and trioctyl phosphate.

One of the above-described nonaqueous organic solvents may be singly used, or two or more of these may be used in combination. Among these, from the viewpoint of realizing excellent battery characteristics, the nonaqueous organic solvent contains preferably at least one of the cyclic carbonate and the chain carbonate, and more preferably the cyclic carbonate and the chain carbonate.

Besides, from the viewpoint of the cycle characteristic, the nonaqueous organic solvent contains preferably at least one selected from the group consisting of a fluorinated ether, a fluorinated carbonate and a fluorinated phosphate (hereinafter sometimes referred to as a fluorine-containing nonaqueous organic solvent). In particular, the nonaqueous organic solvent preferably contains the cyclic carbonate containing no fluorine, the chain carbonate containing no fluorine, and the fluorine-containing nonaqueous organic solvent. In this case, a content of the cyclic carbonate containing no fluorine in the nonaqueous organic solvent is preferably 5 to 50% by volume, more preferably 10 to 40% by volume, and further preferably 20 to 35% by volume. A content of the chain carbonate containing no fluorine in the nonaqueous organic solvent is preferably 20 to 94% by volume, more preferably 40 to 80% by volume, and further preferably 50 to 70% by volume. A content of the fluorine-containing nonaqueous organic solvent in the nonaqueous organic solvent is preferably 1 to 40% by volume, more preferably 2 to 20% by volume, and further preferably 3 to 15% by volume.

An example of the fluorinated ether includes a compound represented by the following formula (2):

$$R^1-O-R^2 \quad (2)$$

In formula (2), $R^1$ and $R^2$ each independently represent an alkyl group or a fluorine-containing alkyl group, at least one of $R^1$ and $R^2$ representing a fluorine-containing alkyl group. The alkyl group may be a straight chain group or a branched chain group, and the carbon number of the alkyl group is preferably 1 to 10, and more preferably 1 to 4. The same is applied to an alkyl group of the fluorine-containing alkyl group.

Specific examples of the fluorinated ether include $CF_3OCH_3$, $CF_3OC_2H_5$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CF_2)_4CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2CH_2OCH_2CF_2CF_3$, $H(CF_2)_2CH_2OCF_2CHFCF_3$, $CHF_2CH_2OCF_2CFHCF_3$, $F(CF_2)_2CH_2OCF_2CHFCF_3$, $CF_3(CF_2)_3OCHF_2$. One of these may be singly used, or two or more of these may be used together.

Examples of the fluorinated carbonate include fluoroethylene carbonate (FEC), fluoromethyl methyl carbonate, 2-fluoroethyl methyl carbonate, ethyl-(2-fluoroethyl) carbonate, (2,2-difluoroethyl)ethyl carbonate, bis(2-fluoroethyl) carbonate, ethyl-(2,2,2-trifluoroethyl) carbonate, 1,1,2,2-tetrafluoroethyl 2,2,3,3-tetrafluoropropyl ether, 1H,1H,5H-octafluoropentyl 1,1,2,2-tetrafluoroethyl ether, the chain carbonate fluorinated, and the cyclic carbonate fluorinated. One of these may be singly used, or two or more of these may be used together.

Examples of the fluorinated phosphate include tris(2,2,2-trifluoroethyl) phosphate (TFP), tris(trifluoromethyl) phosphate, and tris(2,2,3,3-tetrafluoropropyl) phosphate. One of these may be singly used, or two or more of these may be used together.

The electrolyte is not especially limited, and examples include $LiPF_6$, $LiBF_4$, $LiClO_4$, $LiN(SO_2F)_2$, $LiN(SO_2CF_3)_2$, $LiN(SO_2C_2F_5)_2$, $CF_3SO_3Li$, $C_4F_9SO_3Li$, $LiAsF_6$, $LiAlCl_4$, $LiSbF_6$, $LiPF_4(CF_3)_2$, $LiPF_3(C_2F_5)_3$, $LiPF_3(CF_3)_3$, $(CF_2)_2(SO_2)_2NLi$, $(CF_2)_3(SO_2)_2Li$, Lithium bis(oxalate)borate, Lithium difluoro(oxalato)borate. Among these, $LiPF_6$, $LiBF_4$, $LiN(SO_2F)_2$, $LiN(SO_2CF_3)_2$, or $LiN(SO_2C_2F_5)_2$ is preferably used as the electrolyte. One of these electrolytes may be singly used, or two or more of these may be used in combination.

A concentration of the electrolyte in the nonaqueous electrolyte solution is preferably 0.1 to 3 mol/L, and more preferably 0.5 to 2 mol/L. Besides, a content of the lithium difluorophosphate in the nonaqueous electrolyte solution is preferably 0.005% by mass or more and 10% by mass or less, more preferably 0.01% by mass or more and 5% by mass or less, further preferably 0.05% by mass or more and 2% by mass or less, and particularly preferably 0.1% by mass or more and 0.5% by mass or less.

Besides, the nonaqueous electrolyte solution can contain, as an additional component, for example, a maleic anhydride, ethylene sulfite, a boronic acid ester, 1,3-propane sultone, or 1,5,2,4-dioxadithiane-2,2,4,4-tetraoxide.

<Separator>

A separator can be disposed between the positive electrode and the negative electrode. The separator is not especially limited, and for example, a porous film or nonwoven fabric including a single layer of or a plurality of stacked layers of a polyolefin such as polypropylene or polyethylene, aramid, polyimide or the like can be used. Alternatively, an inorganic material such as glass fiber can be used. Further alternatively, a polyolefin coated with a different material can be used. For example, a polyolefin substrate coated with a fluorine compound or an inorganic fine particle may be used. Alternatively, a laminated film including a polyethylene substrate and a polypropylene layer, a laminated film including a polyolefin substrate and an aramid layer, or the like can be used. The thickness of the separator is preferably 5 to 50 μm, and more preferably 10 to 40 μm from the viewpoint of the energy density of the secondary battery and the mechanical strength of the separator.

<Structure of and Production Method for Lithium Ion Secondary Battery>

The lithium ion secondary battery according to the present example embodiment is not especially limited in the structure, and may be a coin battery, a cylindrical battery, a laminated battery or the like.

An example of the lithium ion secondary battery according to the present example embodiment is illustrated in FIG. 1. The lithium ion secondary battery illustrated in FIG. 1 is a laminated lithium ion secondary battery. In the lithium ion secondary battery, a positive electrode is formed by forming a positive electrode active material layer 1 containing a positive electrode active material on a positive electrode current collector 1A. Besides, a negative electrode is formed by forming a negative electrode active material layer 2 containing a negative electrode active material on a negative electrode current collector 2A. The positive electrode and the negative electrode are immersed in a nonaqueous electrolyte solution, and disposed and stacked to oppose each other with a separator 3 sandwiched therebetween. Besides, the positive electrode is connected to a positive electrode tab 1B, and the negative electrode is connected to a negative electrode tab 2B. The thus obtained battery element is housed in a package 4, with the positive electrode tab 1B and the negative electrode tab 2B exposed outside.

When a voltage is applied to the positive electrode and the negative electrode, charge is caused because a lithium ion is desorbed from the positive electrode active material and a lithium ion is intercalated in the negative electrode active material. Besides, when electrical contact between the positive electrode and the negative electrode is caused outside the secondary battery, discharge is caused because a lithium ion is deintercalated from the negative electrode active material and a lithium ion is intercalated in the positive electrode active material in a direction reverse to that in a charge operation.

As the package, a laminated film can be used. As the laminated film, those stable against the nonaqueous electrolyte solution and having a sufficient vapor barrier property can be appropriately selected for use. For example, polypropylene or polyethylene coated with aluminum, silica, alumina or the like can be used as the laminated film. In particular, from the viewpoint of suppressing the volume expansion, a laminated film coated with aluminum is preferably used.

A representative layer structure of the laminated film is a structure in which a metal thin film layer and a thermofusible resin layer are laminated. Alternatively, a layer structure in which a protective layer of a film of polyester such as polyethylene terephthalate or polyamide is further laminated on the surface of the metal thin film layer opposite to the thermofusible resin layer may be employed. If the battery element is sealed, with the thermofusible resin layer disposed to oppose the battery element, the battery element can be wrapped and sealed. As the metal thin film layer, a foil of Al, Ti, Ti alloy, Fe, stainless steel, Mg alloy or the like having a thickness of, for example, 10 to 100 μm can be used.

A resin used in the thermofusible resin layer is not especially limited as long as the resin is thermally fusible. For example, polypropylene, polyethylene, or an acid-modified product of polypropylene or polyethylene, polyphenylene sulfide, polyester such as polyethylene terephthalate, polyamide, or an ionomer resin obtained by intermolecular bonding, with a metal ion, an ethylene-vinyl acetate copolymer, an ethylene-methacrylic acid copolymer or an ethylene-acrylic acid copolymer can be used. The thermofusible resin layer has a thickness of preferably 10 to 200 μm, and more preferably 30 to 100 μm.

The lithium ion secondary battery according to the present example embodiment can be produced by a method including producing a positive electrode containing a lithium transition metal composite oxide containing Fe and containing an over-stoichiometric amount of lithium; and assembling a lithium ion secondary battery including the positive electrode, and a nonaqueous electrolyte solution according to the present example embodiment. Specifically, it can be produced by the following method: A positive electrode and a negative electrode produced by the above-described methods are stacked, as illustrated in FIG. 1, with a separator 3 sandwiched between a positive electrode active material layer 1 and a negative electrode active material layer 2. A positive electrode tab 1B and a negative electrode tab 2B are respectively welded to one ends of a positive electrode current collector 1A and a negative electrode current collector 2A. Thus, a battery element is produced. The battery element is wrapped with a package 4, three sides of the package 4 are sealed, and the above-described nonaqueous electrolyte solution is introduced into the package 4 for impregnation at an appropriate degree of vacuum. Thereafter, the remaining one side of the package 4 is sealed under reduced pressure, and thus, the lithium ion secondary battery can be produced. The lithium ion secondary battery may be subjected to an activation treatment by repeating charge/discharge cycles several times, and thereafter, a gas in the battery may be released by breaking a sealed portion of the package 4 once for lowering the inside pressure, and the broken portion may be sealed again.

EXAMPLES

Example 1

<Positive Electrode>

A slurry containing 92% by mass of $Li_{1.26}Ni_{0.11}Mn_{0.52}Fe_{0.11}O_2$, that is, a lithium transition metal composite oxide containing Fe and containing an over-stoichiometric amount of lithium used as a positive electrode active material, 4% by mass of ketchen black and 4% by mass of polyvinylidene fluoride was prepared. The slurry was applied onto one surface of a positive electrode current collector made of an aluminum foil (having a thickness of 20 μm), and the resultant was dried to produce a positive electrode having a thickness of 175 μm. Besides, a double-sided electrode obtained by applying the slurry onto both surfaces of a positive electrode current collector and drying the resultant was produced in a similar manner.

<Negative Electrode>

A slurry containing 85% by mass of SiO having an average particle size of 15 μm and 15% by mass of polyamic acid was prepared. The slurry was applied onto one surface of a negative electrode current collector made of a copper foil (having a thickness of 10 μm), and the resultant was dried to produce a negative electrode having a thickness of 46 μm. Then, the negative electrode was annealed at 350° C. for 3 hours in a nitrogen atmosphere for curing the polyamic acid. Besides, a double-sided electrode obtained by applying the slurry onto both surfaces of a negative electrode current collector and drying and annealing the resultant was produced in a similar manner.

<Nonaqueous Electrolyte Solution>

A nonaqueous organic solvent was prepared by mixing ethylene carbonate (EC), diethyl carbonate (DEC) and fluoroethylene carbonate (FEC) in a volume ratio of 28.5:66.5:5.0. In the thus obtained nonaqueous organic solvent, $LiPF_6$ was dissolved as an electrolyte in a concentration of 1.0 mol/L. Besides, 0.2% by mass of lithium difluorophosphate was dissolved therein to prepare a nonaqueous electrolyte solution.

<Lithium Ion Secondary Battery>

The positive electrode and the negative electrode produced in the aforementioned manner were shaped. As illustrated in FIG. 1, the positive electrode and the negative electrode were stacked with a separator 3 of a porous film sandwiched between a positive electrode active material layer 1 and a negative electrode active material layer 2. A positive electrode tab 1B and a negative electrode tab 2B were respectively welded to one end of the positive electrode current collector 1A and the negative electrode current collector 2A. Thus, a battery element was produced. The battery element was wrapped with a package 4 of an aluminum laminated film, three sides of the package 4 were sealed by thermal fusion, and then, the nonaqueous electrolyte solution was introduced into the package 4 for impregnation at an appropriate degree of vacuum. Thereafter, the remaining one side of the package 4 was sealed by the thermal fusion under reduced pressure, and thus, a lithium ion secondary battery prior to an activation treatment was produced.

The lithium ion secondary battery prior to an activation treatment was charged to 4.5 V with a current of 20 mA per gram of the positive electrode active material (20 mA/g). Thereafter, the secondary battery was discharged to 1.5 V with a current of 20 mA per gram of the positive electrode active material (20 mA/g). Thereafter, the secondary battery was similarly charged to 4.5 V at 20 mA/g and then discharged to 1.5 V. In other words, an activation treatment in which the charge/discharge cycle was repeated twice was carried out. Subsequently, a sealed portion of the package 4 was once broken to lower the inside pressure for releasing a gas in the battery, and the broken portion was sealed again, and thus, a lithium ion secondary battery was produced.

Example 2

A lithium ion secondary battery was produced in the same manner as in Example 1 except that a nonaqueous electrolyte solution was prepared by dissolving 2% by mass of lithium difluorophosphate.

Example 3

A lithium ion secondary battery was produced in the same manner as in Example 1 except that a nonaqueous electrolyte solution was prepared by dissolving 0.05% by mass of lithium difluorophosphate.

Example 4

A lithium ion secondary battery was produced in the same manner as in Example 1 except that a nonaqueous organic solvent was prepared by mixing EC, DEC and 1,1,2,2-tetrafluoroethyl 2,2,3,3-tetrafluoropropyl ether (FE-1) in a volume ratio of 28.5:66.5:5.0.

Example 5

A lithium ion secondary battery was produced in the same manner as in Example 1 except that a nonaqueous organic solvent was prepared by mixing EC, DEC, and 1H,1H,5H-octafluoropentyl 1,1,2,2-tetrafluoroethyl ether (FE-2) in a volume ratio of 28.5:66.5:5.0.

Example 6

A lithium ion secondary battery was produced in the same manner as in Example 1 except that a nonaqueous organic solvent was prepared by mixing EC, DEC, and tris(2,2,2-trifluoroethyl) phosphate (TFP) in a volume ratio of 28.5:66.5:5.0.

Example 7

A lithium ion secondary battery was produced in the same manner as in Example 1 except that $Li_{1.23}Ni_{0.15}Mn_{0.54}Fe_{0.15}O_2$ was used as a positive electrode active material.

Comparative Example 1

A lithium ion secondary battery was produced in the same manner as in Example 1 except that a nonaqueous electrolyte solution not containing lithium difluorophosphate was prepared.

Comparative Example 2

A lithium ion secondary battery was produced in the same manner as in Example 4 except that a nonaqueous electrolyte solution not containing lithium difluorophosphate was prepared.

Comparative Example 3

A lithium ion secondary battery was produced in the same manner as in Example 5 except that a nonaqueous electrolyte solution not containing lithium difluorophosphate was prepared.

Comparative Example 4

A lithium ion secondary battery was produced in the same manner as in Example 6 except that a nonaqueous electrolyte solution not containing lithium difluorophosphate was prepared.

Comparative Example 5

A lithium ion secondary battery was produced in the same manner as in Example 7 except that a nonaqueous electrolyte solution not containing lithium difluorophosphate was prepared.

<Evaluation Method for Lithium Ion Secondary Battery>

Each of the lithium ion secondary batteries produced by the above-described methods was charged, in a thermostatic chamber at 45° C., to 4.5 V with a constant current of 40 mA/g, and was further continuously charged with a constant voltage of 4.5 V until a current of 5 mA/g was obtained. Thereafter, the battery was discharged to 1.5 V with a current of 5 mA/g as conditioning process.

Thereafter, the lithium ion secondary battery having been subjected to the conditioning process was charged, in a thermostatic chamber at 45° C., to 4.5 V with a constant current of 40 mA/g, and was further continuously charged with a constant voltage of 4.5 V until a current of 5 mA/g was obtained. Thereafter, the battery was discharged to 1.5

V with a current of 40 mA/g. This charge/discharge cycle was repeated by 30 times in total.

Then, on the basis of a ratio of an initial discharge capacity obtained in the 1st cycle and a discharge capacity obtained in the 30th cycle, capacity retention after the 30 cycles was obtained. Besides, with respect to the battery of each of the Examples and the Comparative examples, an amount of gas generated through the 30 cycles was obtained. The amount of generated gas was measured by the Archimedean method. With respect to the amount of generated gas, the amount of gas generated in each example was calculated on the assumption that the amount of gas generated in the corresponding comparative example was 100. Specifically, the amount of gas generated in each of Examples 1 to 3 was calculated on the assumption that the amount of gas generated in Comparative Example 1 was 100. The amount of gas generated in Example 4 was calculated on the assumption that the amount of gas generated in Comparative Example 2 was 100. The amount of gas generated in Example 5 was calculated on the assumption that the amount of gas generated in Comparative Example 3 was 100. The amount of gas generated in Example 6 was calculated on the assumption that the amount of gas generated in Comparative Example 4 was 100. The amount of gas generated in Example 7 was calculated on the assumption that the amount of gas generated in Comparative Example 5 was 100.

<Evaluation Results of Lithium Ion Secondary Battery>

The composition of the nonaqueous organic solvent, the addition amount of lithium difluorophosphate, the type of the positive electrode active material, the amount of gas generated through the 30 cycles, and the capacity retention after the 30 cycles of each of the examples and the comparative examples are shown in Table 1.

capacity retention is improved by 10% or more in Examples 1 to 7 as compared with that in the corresponding ones of Comparative Examples 1 to 5.

It was confirmed, based on comparison between Examples 1 to 7 and Comparative Examples 1 to 5, that if a nonaqueous electrolyte solution contains lithium difluorophosphate, the amount of gas generated in a cycle operation can be suppressed and high capacity retention can be obtained in a lithium ion secondary battery using, as a positive electrode active material, a lithium transition metal composite oxide containing Fe and containing an over-stoichiometric amount of lithium.

In this manner, in a lithium ion secondary battery using, as a positive electrode active material, a lithium transition metal composite oxide containing Fe and containing an over-stoichiometric amount of lithium according to the present example embodiment, if a nonaqueous electrolyte solution contains lithium difluorophosphate, the amount of gas generated in a cycle operation can be suppressed and an excellent characteristic of high capacity retention can be exhibited.

Although the present invention has been described with reference to the example embodiment and the examples, it is noted that the present invention is not limited to the above-described example embodiment and examples. Various modifications apparent to those skilled in the art can be made in the structure and the details of the present invention within the scope of the present invention.

INDUSTRIAL APPLICABILITY

A lithium ion secondary battery according to the present example embodiment can be used in, for example, all the industrial fields requiring a power source, and industrial

TABLE 1

|  | Nonaqueous organic solvent (volume ratio) | Lithium difluorophosphate (% by mass) | Positive electrode active material[1] | Amount of generated gas | Capacity retention (%) |
|---|---|---|---|---|---|
| Example 1 | EC/DEC/FEC (28.5/66.5/5.0) | 0.2 | A | 25 | 73 |
| Example 2 | EC/DEC/FEC (28.5/66.5/5.0) | 2 | A | 23 | 69 |
| Example 3 | EC/DEC/FEC (28.5/66.5/5.0) | 0.05 | A | 24 | 74 |
| Comparative Example 1 | EC/DEC/FEC (28.5/66.5/5.0) | 0 | A | 100 | 59 |
| Example 4 | EC/DEC/FE-1 (28.5/66.5/5.0) | 0.2 | A | 21 | 72 |
| Comparative Example 2 | EC/DEC/FE-1 (28.5/66.5/5.0) | 0 | A | 100 | 58 |
| Example 5 | EC/DEC/FE-2 (28.5/66.5/5.0) | 0.2 | A | 28 | 70 |
| Comparative Example 3 | EC/DEC/FE-2 (28.5/66.5/5.0) | 0 | A | 100 | 58 |
| Example 6 | EC/DEC/TFP (28.5/66.5/5.0) | 0.2 | A | 35 | 67 |
| Comparative Example 4 | EC/DEC/TFP (28.5/66.5/5.0) | 0 | A | 100 | 51 |
| Example 7 | EC/DEC/FEC (28.5/66.5/5.0) | 0.2 | B | 34 | 72 |
| Comparative Example 5 | EC/DEC/FEC (28.5/66.5/5.0) | 0 | B | 100 | 54 |

[1] Positive electrode active material A: $Li_{1.26}Ni_{0.11}Mn_{0.52}Fe_{0.11}O_2$, Positive electrode active material B: $Li_{1.23}Ni_{0.15}Mn_{0.54}Fe_{0.15}O_2$ Referring to Table 1, it was confirmed that the amount of gas generated in Examples 1 to 7 is reduced to 21 to 35% as compared with that in the corresponding ones of Comparative Examples 1 to 5. Besides, it was confirmed that the fields relating to transportation, storage and supply of electrical energy. Specifically, the lithium ion secondary battery according to the present example embodiment can be used as a power source for mobile devices such as a cellular phone, a notebook personal computer, a tablet terminal, and a portable game machine. Besides, the lithium ion secondary battery according to the present example embodiment can be used as a power source for transport media such as an electric vehicle, a hybrid vehicle, an electric bike, and an electric power-assisted bicycle. In addition, the lithium ion secondary battery according to the present example embodiment can be used in a household energy storage system, a backup power supply such as a UPS, and an energy storage facility for storing power generated by solar power generation, wind power generation and the like.

(Supplementary note 1) A lithium ion secondary battery in which the nonaqueous organic solvent contains at least one of a chain carbonate and a cyclic carbonate.

(Supplementary note 2) A lithium ion secondary battery in which the nonaqueous organic solvent contains at least one selected from the group consisting of a fluorinated ether, a fluorinated carbonate and a fluorinated phosphate.

(Supplementary note 3) A lithium ion secondary battery including a positive electrode containing a positive electrode active material, and a nonaqueous electrolyte solution, in which the nonaqueous electrolyte solution contains a nonaqueous organic solvent, an electrolyte, and lithium difluorophosphate, and the positive electrode active material contains at least one compound selected from the group consisting of a compound represented by the following formula (1) and a compound obtained by substituting, by at least one element selected from the group consisting of Co, Sn, Mg, Ti, Al, Zr, Cr, V, Ga, Ge, Zn, Cu, Bi, Mo and La, a part of at least one element selected from the group consisting of Ni, Mn and Fe contained in the compound:

$$Li_{1+a}Ni_xMn_yFe_zO_2 \quad (1)$$

(in formula (1), $0<a\leq0.5$, $0<x<1$, $0<y<1$, and $0<z<1$).

(Supplementary note 4) A method for producing a lithium ion second battery, including producing a positive electrode containing a lithium transition metal composite oxide containing Fe and containing an over-stoichiometric amount of lithium; and assembling a lithium ion secondary battery including the positive electrode and a nonaqueous electrolyte solution, in which the nonaqueous electrolyte solution contains a nonaqueous organic solvent, an electrolyte, and lithium difluorophosphate.

REFERENCE SIGNS LIST 1 positive electrode active material layer
1A positive electrode current collector
1B positive electrode tab
2 negative electrode active material layer
2A negative electrode current collector
2B negative electrode tab
3 separator
4 package

The invention claimed is:

1. A lithium ion secondary battery, comprising: a positive electrode comprising a lithium transition metal composite oxide comprising Fe and comprising an over-stoichiometric amount of lithium; and a nonaqueous electrolyte solution,
wherein the nonaqueous electrolyte solution comprises a nonaqueous organic solvent, an electrolyte, and lithium difluorophosphate,
wherein the lithium transition metal composite oxide comprises at least one compound selected from the group consisting of a compound represented by the following formula (1) and a compound obtained by substituting, by at least one element selected from the group consisting of Co, Sn, Mg, Ti, Al, Zr, Cr, V, Ga, Ge, Zn, Cu, Bi, Mo and La, a part of at least one element selected from the group consisting of Ni, Mn and Fe comprised in the compound:

$$Li_{1+a}NiM_xFe_zO_2 \quad (1)$$

wherein $0<a\leq0.5$, $0<x<1$, $0<y<1$, and $0<z<1$.

2. The lithium ion secondary battery according to claim 1, wherein the nonaqueous electrolyte solution comprises the lithium difluorophosphate in an amount of 0.005% by mass or more and 10% by mass or less.

3. The lithium ion secondary battery according to claim 1, wherein the nonaqueous organic solvent comprises a chain carbonate comprising no fluorine, a cyclic carbonate comprising no fluorine, and at least one selected from the group consisting of a fluorinated ether, a fluorinated carbonate and a fluorinated phosphate.

4. The lithium ion secondary battery according to claim 1, further comprising a negative electrode comprising a material capable of intercalating/deintercalating a lithium ion.

5. The lithium ion secondary battery according to claim 4, wherein the material capable of intercalating/deintercalating a lithium ion is at least one selected from the group consisting of silicon, a silicon oxide and carbon.

* * * * *

UNITED STATES PATENT AND TRADEMARK OFFICE
CERTIFICATE OF CORRECTION

PATENT NO. : 10,622,678 B2
APPLICATION NO. : 15/736067
DATED : April 14, 2020
INVENTOR(S) : Katsumi Maeda, Noriyuki Tamura and Sadanori Hattori It is certified that error appears in the above-identified patent and that said Letters Patent is hereby corrected as shown below:

In the Claims

Column 18, Line 26; Claim 1, delete "$Li_{1+a}NiM_xFe_zO_2$" and insert -- $Li_{1+a}Ni_xMn_yFe_zO_2$ -- therefor Signed and Sealed this
Fourteenth Day of July, 2020

Andrei Iancu
*Director of the United States Patent and Trademark Office*